US010463970B2

(12) United States Patent
Hewu et al.

(10) Patent No.: US 10,463,970 B2
(45) Date of Patent: Nov. 5, 2019

(54) INFORMATION PROCESSING SYSTEM

(71) Applicants: SONY CORPORATION, Tokyo (JP); SONY COMPUTER ENTERTAINMENT INC., Tokyo (JP)

(72) Inventors: Haijie Hewu, Tokyo (JP); Yuji Nakamura, Tokyo (JP); Soushi Urakawa, Tokyo (JP); Nobukazu Koyama, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 986 days.

(21) Appl. No.: 14/896,340

(22) PCT Filed: Jun. 4, 2014

(86) PCT No.: PCT/JP2014/064887
§ 371 (c)(1),
(2) Date: Dec. 4, 2015

(87) PCT Pub. No.: WO2014/196581
PCT Pub. Date: Dec. 11, 2014

(65) Prior Publication Data
US 2016/0121221 A1 May 5, 2016

(30) Foreign Application Priority Data
Jun. 7, 2013 (JP) .................................. 2013-121284

(51) Int. Cl.
*A63F 13/795* (2014.01)
*A63F 13/79* (2014.01)
(Continued)

(52) U.S. Cl.
CPC ............ *A63F 13/79* (2014.09); *A63F 13/352* (2014.09); *A63F 13/48* (2014.09); *A63F 13/87* (2014.09); *A63F 13/795* (2014.09)

(58) Field of Classification Search
CPC ......... A63F 13/48; A63F 13/79; A63F 13/795
See application file for complete search history.

(56) References Cited

U.S. PATENT DOCUMENTS

| 2003/0008713 A1 | 1/2003 | Ushiro et al. |
| 2003/0154250 A1* | 8/2003 | Miyashita ............... H04L 29/06 709/204 |

(Continued)

FOREIGN PATENT DOCUMENTS

| EP | 2530932 A2 | 12/2012 |
| JP | 2002-158659 A | 5/2002 |

(Continued)

OTHER PUBLICATIONS

English Translation of Written Opinion of the International Searching Authority for PCT/JP2014/064887 accompanied with PCT/IB/373 and PCT/IB/338 dated Dec. 17, 2015, acting as concise explanation of previously submitted reference(s).

(Continued)

*Primary Examiner* — Steven J Hylinski
(74) *Attorney, Agent, or Firm* — HEA Law PLLC

(57) ABSTRACT

An information processing system is provided which determines whether a session in which an invited user has been invited to participate is still valid or not before participation in the session. The information processing system includes: storing status information indicating whether each of a plurality of sessions offering a service possibly participated in by the user is valid or not; and storing a plurality of items of invitation information about a plurality of invitations each being an invitation for the invited user to participate in one of the sessions. Each client device acquires one of the (Continued)

plurality of items of invitation information about the invitation for the user using the client device to become the invited user, and displays on a display screen the acquired item of invitation information in a manner reflecting the status information.

9 Claims, 5 Drawing Sheets

(51) Int. Cl.
*A63F 13/87* (2014.01)
*A63F 13/48* (2014.01)
*A63F 13/352* (2014.01)

(56) References Cited

U.S. PATENT DOCUMENTS

| | | | |
|---|---|---|---|
| 2007/0011235 A1 | 1/2007 | Mutikainen et al. | |
| 2009/0063995 A1* | 3/2009 | Baron | G06Q 10/10 715/753 |
| 2011/0093537 A1* | 4/2011 | Kowalewski | H04L 12/1822 709/204 |
| 2012/0203846 A1 | 8/2012 | Hull et al. | |

FOREIGN PATENT DOCUMENTS

| | | |
|---|---|---|
| JP | 2003-030360 A | 1/2003 |
| JP | 2004-199134 A | 7/2004 |
| JP | 2009-523541 A | 6/2009 |
| JP | 2010-224842 A | 10/2010 |
| JP | 2013-078157 A | 4/2013 |
| WO | 2010/044309 A1 | 4/2010 |
| WO | 2012/077409 A1 | 6/2012 |

OTHER PUBLICATIONS

The Office Action dated Mar. 14, 2017 for a corresponding JP Patent Application No. 2013-121284 and a partial translation of the Office Action.
English Translation of International Search Report for PCT/JP2014/064887 dated Sep. 9, 2014.
Office Action dated Jun. 6, 2017, for corresponding CN Patent Application No. 201480031319.9 and English translation thereof.
Office Action dated Dec. 8, 2017, for corresponding CA Patent Application No. 2,914,325 discussing previously cited US patent documents.
Office Action dated Apr. 9, 2018, for corresponding CN Patent Application No. 201480031319.9 and English translation thereof discussing previously cited US patent documents.
Office Action dated Oct. 9, 2018, for corresponding CA Patent Application No. 2,914,325.
Office Action dated Aug. 17, 2016 for corresponding AU application No. 2014275882 discussing previously cited JP patent documents.
Office Action dated Sep. 19, 2019, for corresponding CA Patent Application No. 2,914,325.

* cited by examiner

INFORMATION PROCESSING SYSTEM

CROSS REFERENCE TO RELATED APPLICATIONS

This application is a National Stage of International Application No. PCT/JP2014/064887 filed on Jun. 4, 2014, which claims priority to Japanese Patent Application No. 2013-121284 filed on Jun. 7, 2013. The contents of each of the above documents are incorporated herein by reference in their entirety.

TECHNICAL FIELD

The present invention relates to an information processing system for managing sessions each offering a service in which at least one user can participate, a server system and a client device making up such an information processing system, a control method for such a client device, a program for controlling such a client device, and an information storage medium storing such a program.

BACKGROUND ART

There are services that users can use and participate in via a network, such as chat and multiplayer games. Such services offer a plurality of sessions each possibly participated in by different users like chat rooms. These sessions provide their services independently of one another. Each user participates in one of a plurality of sessions and uses the service provided by the session.

A user participating in a session may want another user such as his/her friend to take part in the same session. Service providers may also wish to invite specific or indefinite users to participate in a service they provide. Such a service may involve offering the function of inviting users to the session by sending out a session invitation message, for example.

SUMMARY

Technical Problem

The sessions above may not exist permanently; they are generated anew as needed. A session may be controlled to end when the users participating in it stop using the service provided by the session. In this case, individual sessions are generated anew as requested by users who wish to use the services provided by the sessions. The session is ended when there are no participants or when the user who requested generation of that session orders it to end, for example. Thus when a user (invited user) has been invited to participate in a session, the session, which was valid at the time of invitation, may have ended by the time the invited user accepts the invitation and tries to participate in the session. In this case, the invited user has no way to know whether the session has already ended or not until the user actually makes a request to participate in the session he/she has been invited to. This is an inconvenience for the invited user.

The present invention has been made in view of the above circumstances. An object of the invention is to provide an information processing system for allowing an invited user invited to a session to know whether the session is still valid or not before the invited user particulates in the session, a server system and a client device making up such an information processing system, a control method for such a client device, a program for controlling such a client device, and an information storage medium storing such a program.

Solution to Problem

According to the present invention, there is provided an information processing system including a plurality of client devices and managing information about a plurality of sessions each offering a service possibly participated in by a user. The information processing system includes: a session managing section configured to store status information indicating whether each of the plurality of sessions is valid or not; and an invitation managing section configured to store a plurality of items of invitation information, each of the items of invitation information being about an invitation for an invited user to participate in one of the plurality of sessions. Each of plurality of the client devices includes: an invitation information acquiring section configured to acquire one of the plurality of items of invitation information stored in the invitation managing section, the acquired item of invitation information being about the invitation for the user using the client device to become the invited user; and an invitation display controlling section configured to display on a display screen the item of invitation information acquired by the invitation information acquiring section in a manner reflecting the status information.

According to the present invention, there is provided a server system connected to a plurality of client devices and managing information about a plurality of sessions each offering a service possibly participated in by a user. The server system includes: a session managing section configured to store status information indicating whether each of the plurality of sessions is valid or not; an invitation managing section configured to store a plurality of items of invitation information, each of the items of invitation information being about an invitation for an invited user to participate in one of the plurality of sessions; an invitation information offering section configured to offer, when requested by one of the plurality of client devices, one of the plurality of items of invitation information stored in the invitation managing section, the offered item of invitation information being about the invitation for the user using the requesting client device to become the invited user; and a status information offering section configured to offer to the requesting client device the status information stored in the session managing section regarding the session targeted for invitation by the offered item of invitation information. The offered status information is used when the client device displays the offered item of invitation information on a display screen.

According to the present invention, there is provided a client device connected to a session managing section configured to store status information indicating whether each of a plurality of sessions offering a service possibly participated in by a user is valid or not; and an invitation managing section configured to store a plurality of items of invitation information, each of the items of invitation information being about an invitation for an invited user to participate in one of the plurality of sessions. The client device includes: an invitation information acquiring section configured to acquire one of the plurality of items of invitation information stored in the invitation managing section, the acquired item of invitation information being about the invitation for the user using the client device to become the invited user; and an invitation display controlling section configured to display on a display screen the item of invitation information acquired by the invitation information acquiring section in a manner reflecting the status information.

According to the present invention, there is provided a control method for a client device connected to a session managing section configured to store status information indicating whether each of a plurality of sessions offering a service possibly participated in by a user is valid or not; and an invitation managing section configured to store a plurality of items of invitation information, each of the items of invitation information being about an invitation for an invited user to participate in one of the plurality of sessions. The control method includes: a step of acquiring one of the plurality of items of invitation information stored in the invitation managing section, the acquired item of invitation information being about the invitation for the user using the client device to become the invited user; and a step of displaying on a display screen the acquired item of invitation information in a manner reflecting the status information.

According to the present invention, there is provided a program for controlling a client device connected to a session managing section configured to store status information indicating whether each of a plurality of sessions offering a service possibly participated in by a user is valid or not; and an invitation managing section configured to store a plurality of items of invitation information, each of the items of invitation information being about an invitation for an invited user to participate in one of the plurality of sessions. The program causes the client terminal to execute: a step of acquiring one of the plurality of items of invitation information stored in the invitation managing section, the acquired item of invitation information being about the invitation for the user using the client device to become the invited user; and a step of displaying on a display screen the acquired item of invitation information in a manner reflecting the status information. Preferably, this program is stored on a computer-readable information storage medium.

DESCRIPTION OF EMBODIMENTS

Some embodiments of the present invention are described below in detail with reference to the accompanying drawings.

Figure 1:
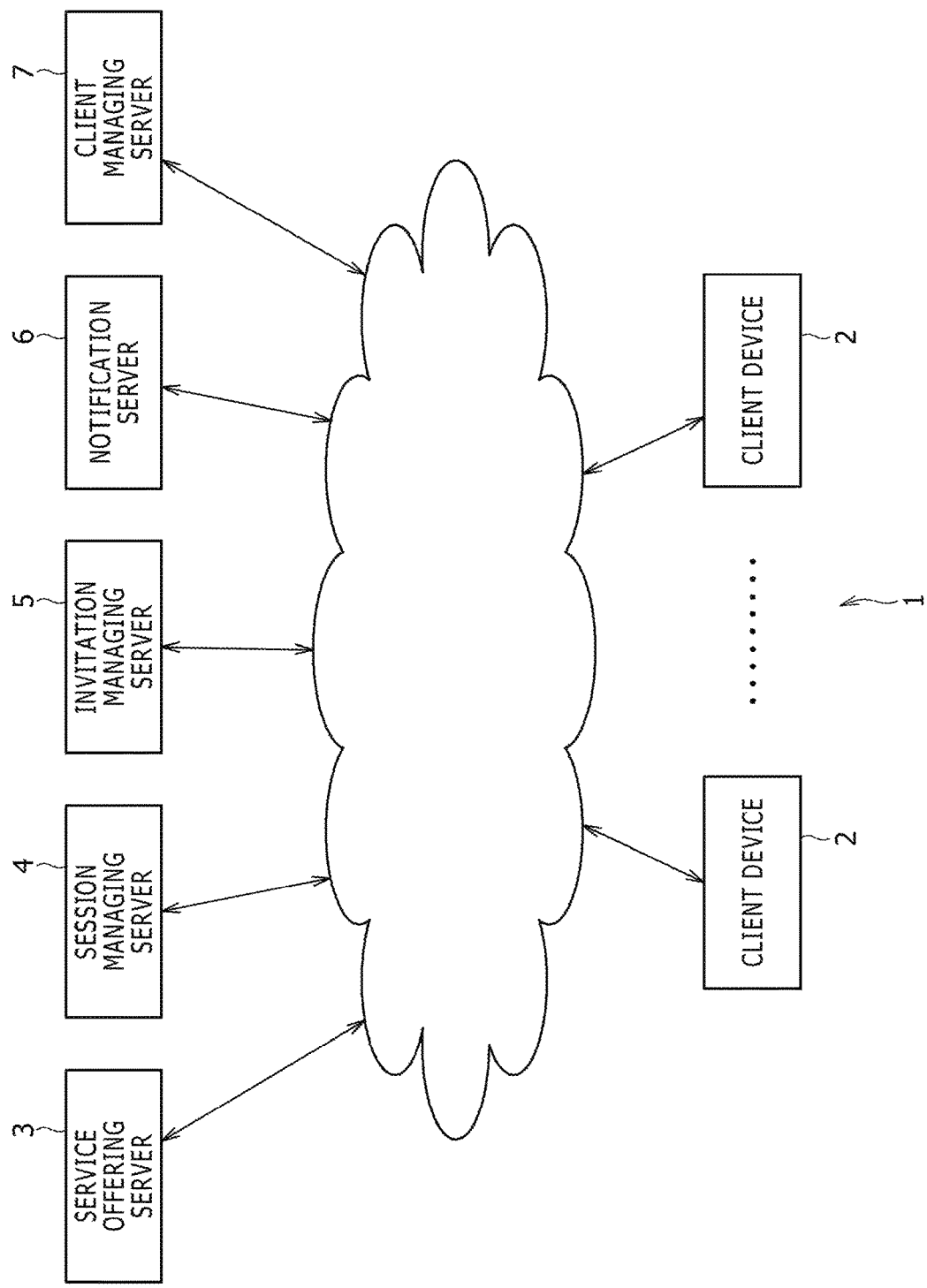
FIG. 1 is an overall configuration diagram of an information processing system in one embodiment of the present invention.

FIG. 1 is an overall configuration diagram of an information processing system 1 in one embodiment of the present invention. As shown in FIG. 1, the information processing system 1 is structured to include a plurality of client devices 2, a service offering server 3, a session managing server 4, an invitation managing server 5, a notification server 6, and a client managing server 7. In this embodiment, the information processing system 1 is assumed to be a game system that offers a multiplayer game-playing environment to users. The service offering server 3 generates a session offering a game service to participants. A session is a unit in which the system offers its services. In the multiplayer game service, a lobby or a room corresponds to a session, for example. A plurality of users participating concurrently in the same session play the same game by fighting against each other or by cooperating with each other. However, users participating in different sessions in the same type of game play different games independently of one another. Although FIG. 1 shows only one service offering server 3, there may be a plurality of service offering servers 3 that may offer game services differing from one another in type. Also, the service offering server 3 may be provided by a game vendor different from the vendor that offers a service infrastructure of the information processing system 1 by setting up the session managing server 4, invitation managing server 5, notification server 6, and client managing server 7.

Figure 2:
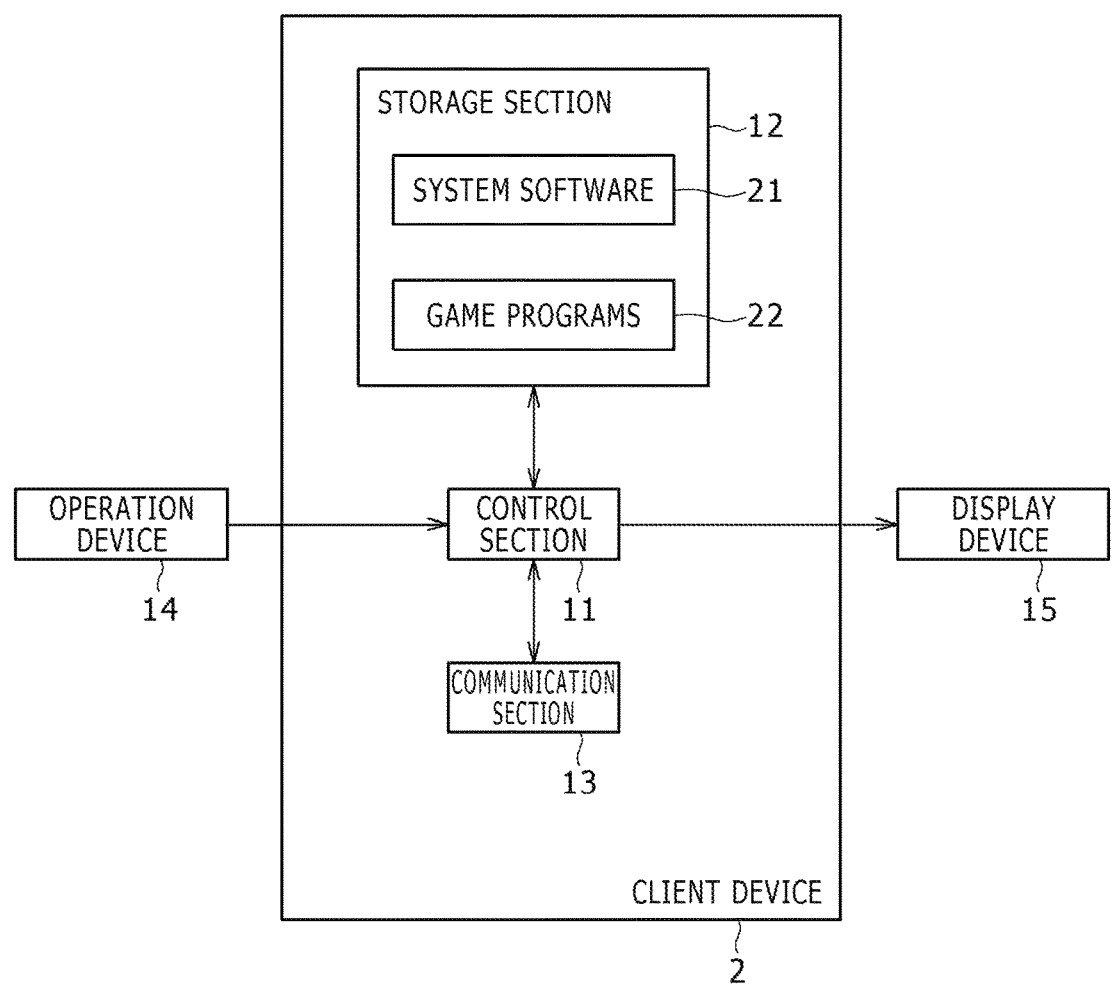
FIG. 2 is a structural block diagram of a client device in one embodiment of the present invention.

The client device 2 is a terminal device used by the user who participates in a session generated by the information processing system 1 and who uses the service offered by the session. For example, the client device 2 is a home video game console, a handheld video game machine, a smartphone, a personal computer, or some other information processing device. As shown in FIG. 2, each client device 2 is structured to include a control section 11, a storage section 12, and a communication section 13. Also, an operation device 14 and a display device 15 are connected to each client device 2.

The control section 11 is a central processing unit (CPU) or like unit that performs diverse kinds of information processing in accordance with programs stored in the storage section 12. The storage section 12 is structured to include a memory device such as a random access memory (RAM) that stores the programs executed by the control section 11 as well as data targeted for processing by the programs.

The communication section 13 is a communication interface such as a local area network (LAN) card. Through the communication section 13, the client device 2 performs data communication with each of the service offering server 3, session managing server 4, invitation managing server 5, and notification server 6.

The operation device 14 is a game console controller, a keyboard, or a mouse, for example. The operation device 14 receives the input of operations made by the user and outputs the content of the received input to the client device 2. The display device 15 is a liquid crystal display or an organic electroluminescent (EL) display, for example. The display device 15 displays on a display screen the image corresponding to a video signal output from the client device 2. Incidentally, the operation device 14 and the display device 15 may each be provided independently of the housing of the client device 2, or may be incorporated integrally in the housing of the client device 2.

The storage section 12 of the client device 2 stores system software (basic software) 21 and game programs 22. These programs are executed by the control section 11. The system software 21 is a program that offers basic functions needed in using this system regardless of the game type. The game programs 22 are application programs to be executed by the client device 2 in using the services offered by the service offering server 3. Each of the game programs 22 is prepared for each game type. The user needs to obtain beforehand the game program 22 corresponding to the session in which the user plans to participate and, while participating in the session, needs to have the game program 22 executed by the client device 2. These programs may be stored on a computer-readable information storage medium such as an optical disk or downloaded via communication lines such as the Internet when offered to the client device 2.

The service offering server 3 generates a new session in accordance with session start request from one of the client devices 2 and performs game processing on the generated session. The service offering server 3 may generate a plurality of sessions that carry out processes independently of one another regarding games. Each session receives a participation request from the user of the client device 2. The session transmits the result of the executing game process to each client device 2 used by the user participating in the session, thus offering the game service to the participating user. This allows a plurality of users participating in the same session to play a multiplayer game together by fighting against each other or by cooperating with each other.

The session managing server 4 manages information about the sessions generated by the service offering server 3. The information held in and specific processes performed by the session managing server 4 will be discussed later.

The invitation managing server 5 manages invitations extended between users. In this embodiment, any user participating in a session may invite another user to participate in the same session. The information about the invitations is managed by the invitation managing server 5 and is referenced by the client device 2. The information held in and specific processes performed by the invitation managing server 5 will be discussed later.

The notification server 6 maintains network connections with the client devices 2 currently using the services offered by this system and, in response to requests from other servers, gives various notifications such as invitation messages to the client devices 2. Specifically, when a user starts up his/her client device 2 and logs in to a service of this system, a network connection is established between the client device 2 and the notification server 6. While the client device 2 is using the service, the notification server 6 maintains the network connection with the client device 2. When the user is to be notified of an invitation message, for example, the notification server 6 uses the maintained network connection to give a push notification to the client device 2. In this manner, the user may be notified of diverse information in real time.

The client managing server 7 manages online status of each client device 2. Specifically, when the notification server 6 establishes a network connection with a client device 2, the notification server 6 notifies the client managing server 7 that the client device 2 is currently online. Given the notification, the client managing server 7 adds information about the newly connected client device 2 to a list of currently online client devices 2 (online client list). When the user of the client device 2 stops using the service and logs out, the network connection between the notification server 6 and the client device 2 is disconnected. The notification server 6 then notifies the client managing server 7 that the client device 2 is currently offline. Upon receipt of the notification, the client managing server 7 deletes the information about the offline client device 2 from the online client list. If the communication connection with a client device 2 that has been online so far is disconnected due to some error and is not reestablished within a predetermined time period, the notification server 6 determines that the client device 2 is currently offline and notifies the client managing server 7 to that effect. This allows the client managing server 7 to manage in real time which client devices 2 are currently online. In addition to the online status of the client devices 2, the client managing server 7 may manage other information acquired from each client device 2 such as the type of the game program 22 currently executed by that client device 2.

Figure 3:
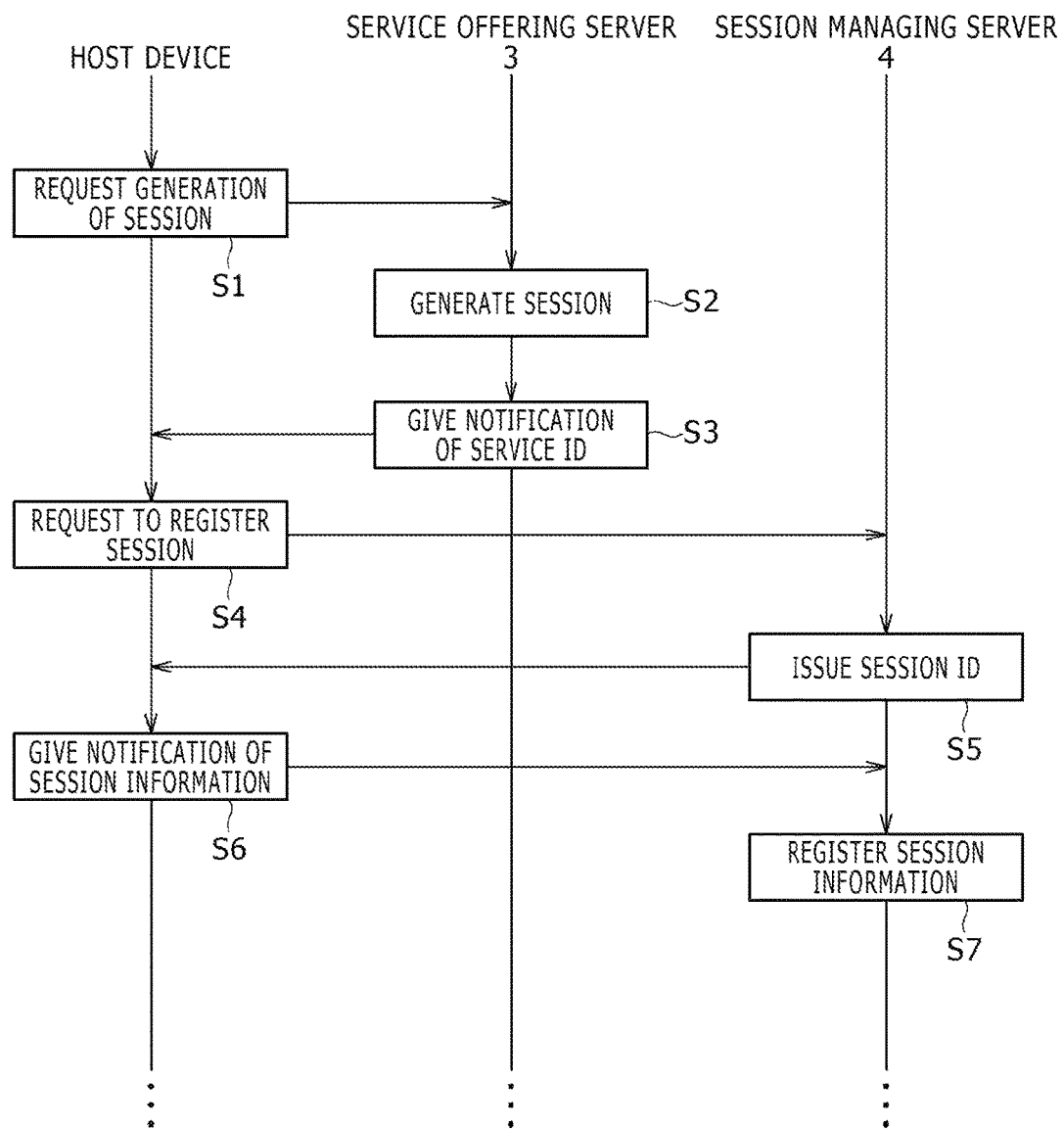
FIG. 3 is a schematic diagram showing an exemplary flow of processing performed when the information processing system in one embodiment generates a session.

Explained below with reference to the flowchart of FIG. 3 is a specific flow of processing performed by the information processing system 1 of this embodiment when a session is generated.

A client device 2 used by a user executes a game program 22 to transmit a session generation request to the service offering server 3 that offers the game corresponding to the executing game program 22 (step S1). In the ensuing description, the user making the session generation request will be referred to as the host user, and the client device 2 used by the host user to transmit the session generation request will be referred to as the host device. On receiving the session generation request from the host device, the service offering server 3 generates a new session and gives it identification information so as to identify the newly generated session within the service offering server 3 (step S2). For distinction from a session identification (ID) (to be discussed later) given to a session by the session managing server 4, the session identification information given to each session generated by the service offering server 3 will be referred to as the service ID in the description that follows. Upon giving the service ID to the session, the service offering server 3 notifies the client device 2 of that service ID (step S3).

Given the notification in step S3, the host device transmits to the session managing server 4 a registration request to register information about the session generated in step S2 (step S4). The registration request includes information identifying the service offering server 3 that has generated the session, and the service ID given to the session by the service offering server 3. Upon receiving the registration request, the session managing server 4 issues a session ID to the session targeted for registration by the registration request and notifies the host device of the issued session ID (step S5). Unlike the service ID given by the service offering server 3 in step S2, the session ID is a value that uniquely identifies the session in the entire system. When notified of the session ID, the host device notifies the session managing server 4 of diverse items of information regarding the session to be registered in the session managing server 4 (step S6). On receiving the information in step S6, the session managing server 4 registers the received information in a database the session managing server 4 manages (step S7).

What follows is a description of the information about the session registered in step S7 and managed by the session managing server 4. With regard to each session generated by the service offering server 3, the session managing server 4 stores as session-related information such related items of information as a session ID, session reference destination information, a session name, a session image, accessory information, device type information, a public flag, a game title name, a participant list, a host user ID, a session generation time, and a validity flag. The session ID is information that identifies each session within the session managing server 4. As described above, the session ID is issued by the session managing server 4 when the information about a new session is registered in the session managing server 4. The session reference destination information is information that identifies the source offering the service with regard to the session. For example, the session reference destination information may include address information of the service offering server 3 and a service ID. In this case, the host device notifies the session managing server 4 of the address information and the service ID in step S4 as described above.

The session name is the name of this session. The session image and the accessory information make up information regarding the content and status of the game played in the session. The session image may be image data representative of a play screen of the session, for example. The accessory information such as a stage name is used to inform the user of the content and status of the session.

The device type information is information indicative of the device type of the client device 2 allowed to participate in the session. Different types of games can be played selectively on different types of participating client devices 2. For example, some games can be played only on a particular home video game console; others may be played on any of the home video game console, handheld video game machine, and personal computer. The device type information stipulates the type of the client device 2 allowed to participate in the session. The public flag is flag information indicating whether or not the information regarding this session has been made public to indefinite users. Anyone can reference the content of the session for which the public flag is set to on; any user may request to participate in that session. In contrast, only invited users are allowed to reference the information about the session for which the public flag is set to off and to participate in the session. The content of the session name, session image, accessory information, device type information, and public flag is determined by the game program 22 of the host device or by the service offering server 3, before being transmitted to the session managing server 4 by the system software 21 in step S6. Alternatively, the content of the session image and accessory information may be updated in a suitably timed manner in accordance with the situation change of the session to reflect the information offered by the service offering server 3 to the session managing server 4.

The game title name is information that identifies the type of the game (i.e., game title) offered by the session. When notifying the session managing server 4 of the session information, the system software 21 of the host device acquires the name of the currently executing game program 22 as the information representing the game title name.

The participant list is a list of users participating in the session. If the client device 2 used by a user other than the host user participates anew in the currently executing session, the client device 2 notifies the session managing server 4 to that effect. Given the notification, the session managing server 4 adds the user ID of the newly participating user to the participant list. When a user has stopped participating in the session, the client device 2 used by that user notifies the session managing server 4 of the end of the participation. Upon receipt of the notification, the session managing server 4 deletes from the participant list the user ID of the user who has stopped participating. When any client device 2 goes offline, the client managing server 7 notifies the session managing server 4 to that effect. Given the notification, the session managing server 4 searches for the session participated in by the user of the applicable client device 2 and deletes the user ID of that user from the participant list of the session. This enables the information about the offline user to be deleted from the participant list even if his/her client device 2 fails to normally complete the process of ending the participation in the session.

The host user ID is information that identifies the host user who has requested the generation of the session. The session generation time is information indicative of the time at which the session was generated. When the session managing server 4 registers the information about a new session, date and time information at that point in time is recorded as the session generation time.

The validity flag is flag information indicating whether the session is valid or invalid. When the session managing server 4 registers the information about a new session, the value indicating the validity of the session is set to validity flag. At the end of the session, the client device 2 that initiated the end of the session notifies the session managing server 4 of the session end. Given the notification, the session managing server 4 sets to invalid the validity flag of the session targeted by the notification. For example, the condition for ending the session is met by the host user having stopped participating in the session. In that case, the host device notifies the session managing server 4 of the end of the session. Alternatively, the service offering server 3 may end the session when there is no participant in the session. In this case, the client device 2 used by the user who has most recently stopped participating in the session notifies the session managing server 4 of the session end. Whereas the client device 2 notifies the session managing server 4 of the start and the end of the session in this example, this is not limitative of the embodiment. Alternatively, the service offering server 3 may notify the session managing server 4 of the start and the end of the session. As another alternative, part or all of the information offered to the session managing server 4 by the client device 2 may be offered to the session managing server 4 not by the client device 2 but by the service offering server 3.

As explained above, the session managing server 4 manages the information about sessions independently of the service offering server 3 that actually generates the sessions and performs processing on the generated sessions. In particular, the information about each session includes the validity flag that is updated in real time whenever a session is actually started or ended. Each client device 2 can thus determine whether a specific session is valid or invalid by referencing the validity flag held by the session managing server 4 without gaining access to the service offering server 3, as will be discussed later. The service offering server 3 is prepared for each game type. Each service offering server 3 is assumed to be accessed by the corresponding game program 22. To access the service offering server 3, the client device 2 needs to execute the corresponding game program 22. However, this embodiment allows the running system software 21 to acquire the information about the session from the session managing server 4 without executing the game program 22.

Specifically, the system software 21 of each client device 2 acquires a list of currently valid sessions by querying the session managing server 4. The user of each client device 2 can select the session that the user plans to participate in from the list without starting the game program 22. At this point, the session managing server 4 may reference the validity flag and thereby offer only the information about the valid session to the client device 2. As described above, the information about the sessions for which the public flag is set to off and to which the querying user is not invited is excluded from the list of sessions offered to the client device 2. The information about the sessions to which the querying user is invited and the information about the sessions to which the querying user is not invited are acquired by querying the invitation managing server 5, to be discussed later.

By executing the game program 22, each client device 2 may let the game program 22 request a list of sessions from the session managing server 4. In this case, the client device 2 requests acquisition of the list including the name of the game program 22 (i.e., game title name) of the user who made the query. Given the request, the session managing server 4 transmits to the client device 2 only the information about the sessions for which the querying user matches the game title name. This allows the game program 22 to acquire only the information about the sessions that can be participated in. Alternatively, the client device 2 may request acquisition of the list that includes the game ID identifying the type of the game program 22 instead of the game title name. In this case, the session managing server 4 stores in relation to each session the game ID identifying the game type corresponding to the session, in place of or in addition to the game title name. Upon receiving the list acquisition request, the session managing server 4 transmits selectively to the client device 2 the game ID included in the acquisition request and the information about the session related to the matching game ID.

Figure 4:
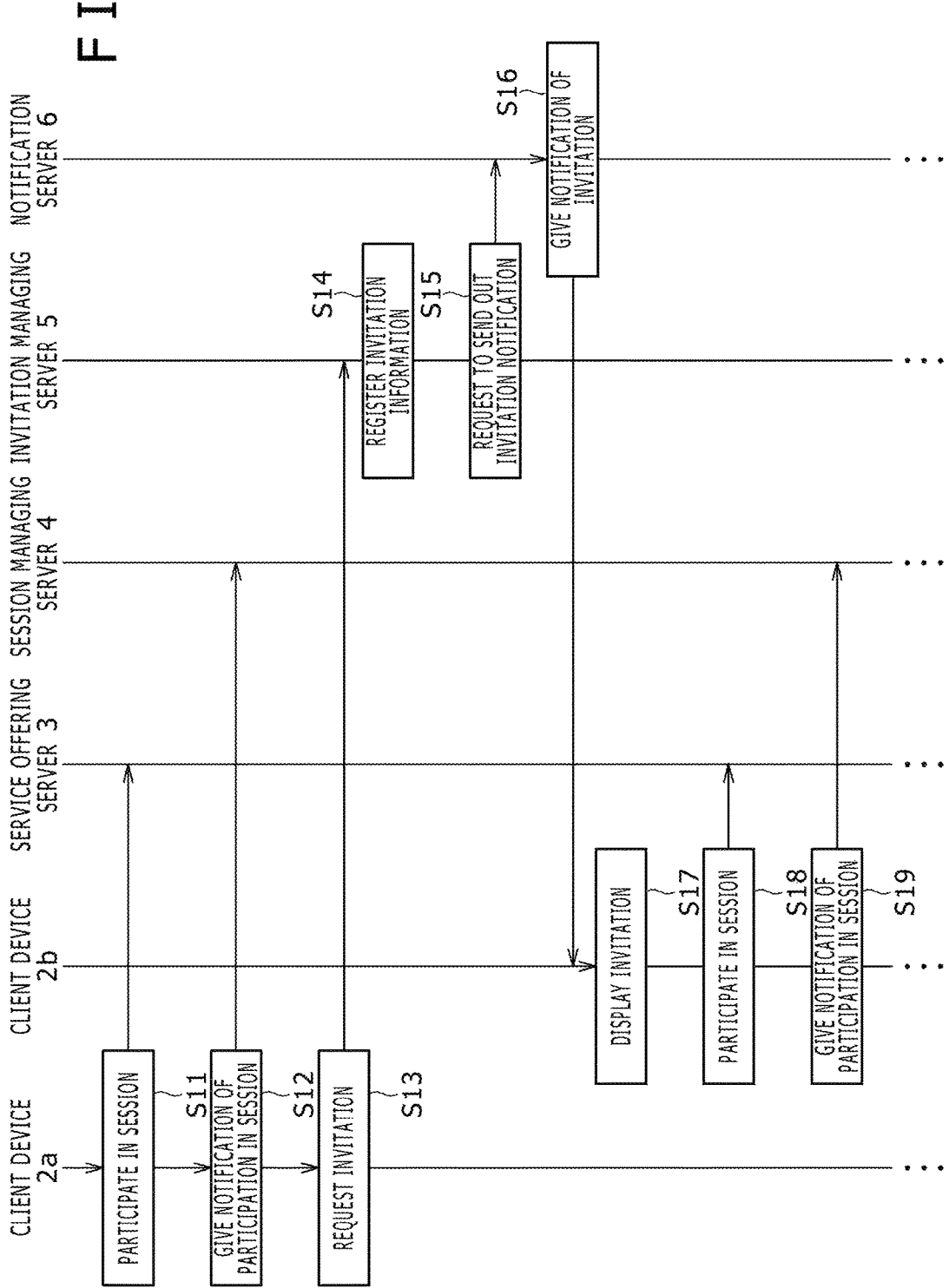
FIG. 4 is a schematic diagram showing an exemplary flow of processing performed when the invitation is extended from the inviting user to the invited user.

Explained below with reference to the flow diagram of FIG. 4 is an exemplary flow of processing performed by the information processing system 1 in this embodiment when a user participating in a session invites another user to participate in the same session (i.e., the invitation is extended from the inviting user to the invited user). In the ensuing description, the client device 2 used by the inviting user will be referred to as the client device 2a, and the client device 2 used by the invited user will be referred to as the client device 2b.

The client device 2a executes the game program 22 to connect with the service offering server 3 offering the game service corresponding to the game program 22, thereby participating in the session (step S11). At this point, the client device 2a notifies the session managing server 4 of the participation by the inviting user in the session along with the session ID identifying the session participated in (step S12). Given the notification, the session managing server 4 adds the user ID of the inviting user to the list of the participants in the session identified by the session ID. Thereafter, under instructions from the inviting user, the client device 2a transmits to the invitation managing server 5 an invitation request including the session ID transmitted in step S12 as well as the user ID of the invited user (step S13).

On receiving the invitation request, the invitation managing server 5 adds information about the invitation to the database the invitation managing server 5 itself manages (step S14), and requests the notification server 6 to send out an invitation notification (step S15). In response to the request in step S15, the notification server 6 notifies the client device 2b used by the invited user of the invitation (step S16).

Given the notification in step S16, the client device 2b causes the display device 15 to indicate on its screen that an invitation is extended (step S17). When the user of the client device 2b gives an instruction to participate in the session to which the user has been invited, the client device 2b makes a session participation request to the service offering server 3 as when the inviting user participated in the session (step S18). When the request to participate in the session is received by the service offering server 3, the client device 2b notifies the session managing server 4 to that effect (step S19). This causes the user ID of the invited user to be added to the list of the participants in the session.

Explained below is the information about the invitation registered in the process of step S14 by the invitation managing server 5 for management purposes. With regard to each invitation accepted, the invitation managing server 5 stores as invitation-related information such related items of information as an invitation ID, an inviting user ID, an invited user ID, a session ID, an invitation message, an invitation time, a session validity flag, a read flag, and a participation flag.

The invitation ID is information that uniquely identifies each invitation and is given by the invitation managing server 5. The inviting user ID and the invited user ID are information identifying the inviting user and the invited user, respectively. The session ID is information that identifies the session targeted by the invitation. The invitation message is text information indicating the content of the message input by the inviting user and addressed to the invited user. The invitation managing server 5 is notified of the inviting user ID, invited user ID, session ID, and invitation message by the client device 2a used by the inviting user. The invitation time is information indicative of the time at which the invitation was extended. The date and time information in effect when the invitation managing server 5 receives an invitation request from the client device 2 is recorded as the invitation time.

The session validity flag is flag information indicating whether the session targeted by the invitation is valid or not. This information is similar to the validity flag managed within the session managing server 4. It should be noted that whereas the validity flag in the session managing server 4 is updated in real time to the value indicating that the session is invalid when ended, the session validity flag in the invitation managing server 5 is not updated in real time. Upon transmitting invitation information in response to the request from the client device 2, the invitation managing server 5 references the session validity flag regarding the invitation. If the session validity flag is found set to invalid, the invitation managing server 5 transmits to the client device 2 the information about the invitation together with information indicating that the session is already invalid. If the session validity flag is found set to valid, the invitation managing server 5 queries the session managing server 4 about the most recent status of the session before transmitting the information about the invitation to the client device 2. The invitation managing server 5 updates the session validity flag to reflect the result of the query, before transmitting the information about the invitation to the client device 2. With this embodiment, the session will never be valid again once made invalid. As mentioned above, the invitation managing server 5 holds the session validity flag independently of the session managing server 4. When the session is already invalid, the invitation managing server 5 can offer the client device 2 the information about the invitation together with information indicating that the session is invalid, without querying the session managing server 4 a number of times. It is not mandatory for the invitation managing server 5 to hold the session validity flag. In this case, the invitation managing server 5 may query the session managing server 4 about the most recent status of the session every time the invitation managing server 5 is about to offer invitation information to the client device 2. The invitation managing server 5 then offers the invitation information together with the result of the query to the client device 2. As another alternative, the client device 2, given the invitation information, may directly query the session managing server 4 and acquire the flag information indicative of the status of the session targeted by the acquired invitation.

The read flag is flag information indicating whether the content of the invitation has been viewed by the invited user or not. The participation flag is another flag information indicating whether the invited user has participated in the session targeted by the invitation. The client device 2b used by the invited user notifies the invitation managing server 5 when the invited user has viewed the content of the invitation or when the invited user has participated in the session to which that user has been invited. Given these notifications, the invitation managing server 5 updates the read flag and the participation flag accordingly.

Explained below is the invitation-related information displayed on the screen of the display device 15 by the client device 2b of the invited user.

When the user of the client device 2b gives an instruction to display invitation information, the client device 2b transmits to the invitation managing server 5 a request to acquire the invitation information together with the user ID of the user who has given the instruction. The invitation information acquisition request may be made either by the system software 21 or by the game program 22. In response to the acquisition request, the invitation managing server 5 transmits to the client device 2b the information about the invitations in which the requesting user is the invited user. At this point, as discussed above, the invitation managing server 5 queries the session managing server 4 as needed to update the session validity flag to the most recent information. The invitation managing server 5 then transmits the invitation information together with the information about the updated session validity flag. The client device 2b displays the invitation information received from the invitation managing server 5 in list form on the screen of the display device 5. When the game program 22 makes the invitation information acquisition request, only the information about the invitations regarding the session corresponding to the game program 22 is offered to the client device 2.

Figure 5:
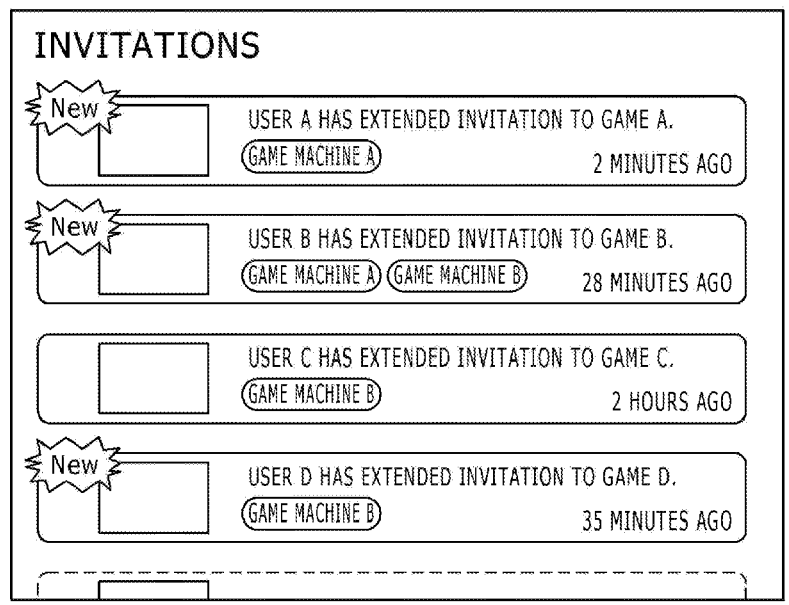
FIG. 5 is a schematic diagram showing an exemplary screen displaying a list of invitations.

FIG. 5 is a schematic diagram showing an exemplary screen displaying a list of invitation information. In FIG. 5, each item of invitation information includes the game title name of the session targeted by the invitation, a session image, the name of the inviting user, and the device type of the client device 2 that can participate in the session. These items of invitation information are acquired from the session managing server 4.

In this embodiment, the client device 2b displays a list of invitations in a manner reflecting the content of the session validity flag. The client device 2b may also display the information about invitations in a manner reflecting the content of the read flag and the participation flag. For example, the client device 2b may display individual invitations in a manner determined by each of the values of the session validity flag and the read flag. In FIG. 5, a mark "New" is attached to each invitation for which the read flag is set to "unread" (i.e., the invitation has yet to be viewed by the invited user). The invitation for which the session validity flag is set to "invalid" (i.e., the session targeted by the invitation has already ended) may be displayed in a manner not attracting much attention of the user, such as a low-tone image obtained by suitable image processing. In FIG. 5, the invitations enclosed by not a solid-line rectangle but a broken-line rectangle each are shown as the invitations of which the sessions have already ended. As another alternative, the client device 2b may display each invitation in a manner reflecting the participation flag.

The client device 2b may further determine the order in which a plurality of invitations are to be displayed in list form in accordance with the content of the session validity flag, read flag, and participation flag. In FIG. 5, for example, the invitations targeted for display are sorted by the value of the session validity flag. This permits display of the invitations to the sessions that are still valid and can be participated in by the user, more preferentially than (i.e., higher than) the invitations to the sessions that have already ended and cannot be participated in. The invitations are also sorted by the value of the read flag. When their session validity flags are set to the same value, the unread invitations are displayed higher than the read invitations. The invitations may further be sorted by the content of the participation flag. For example, when their session validity flags and their read flags are set to the same values, the invitations yet to be participated in may be displayed higher than the invitations already participated in. However, because viewing of an invitation needs to precede the participation in that invited session, there usually is no invitation that is unread and has been participated in. Thus in determining the order in which to display invitations in accordance with all of the session validity flag, read flag, and participation flag, the invitations may be displayed in list form in the following order for example:

1. Invitations of which the sessions are valid, which have yet to be read, and of which the sessions have yet to be participated in.
2. Invitations of which the sessions are valid, which have been read, and of which the sessions have yet to be participated in.
3. Invitations of which the sessions are valid, which have been read, and of which the sessions have been participated in.
4. Invitations of which the sessions are invalid, which have yet to be read, and of which the sessions have yet to be participated in.
5. Invitations of which the sessions are invalid, which have been read, and of which the sessions have yet to be participated in.
6. Invitations of which the sessions are invalid, which have been read, and of which the sessions have been participated in.

In this manner, the invitations of which the sessions are valid are displayed higher and more prominently than the invitations of which the sessions are invalid. This display helps direct the user's attention to the invitations that can still be participated in.

The client device 2b may be arranged not to display, in the invitation list on the screen, the invitations for which the above-mentioned flags meet specific conditions. For example, there is little need for the user who has viewed the content of the invitations of which the sessions have become invalid to again verify the content. The invitations of which the sessions are invalid and which have already been read may thus be excluded from the invitation list targeted for display. If the user is not expected to again participate in the session already participated in, all invitations for which the participation flags are set to "participated in" may be excluded from the invitations targeted for display.

In this embodiment, one user may use a plurality of client devices 2. In such a case, it is the invitation managing server 5 that holds the read flags and the participation flags, not the client devices 2 in the information processing system 1. This enables the information processing system 1 to manage which user has viewed which invitations and which user has participated in which sessions on invitation, regardless of which of the client devices 2 has been used.

Figure 6:
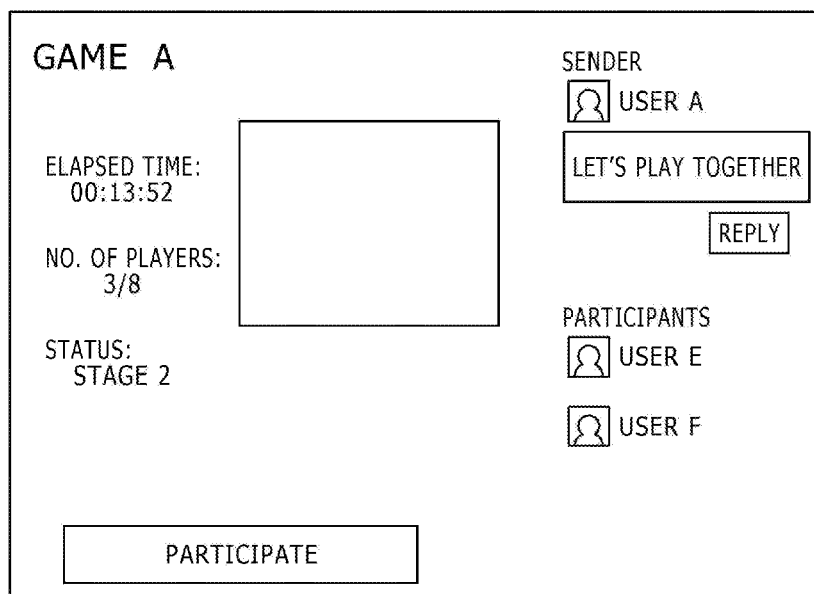
FIG. 6 is a schematic diagram showing an exemplary detailed display screen of invitation information.

When the user selects one of the invitations listed on the screen as shown in FIG. 5, a detailed display screen appears, displaying the details of the selected invitation. FIG. 6 is a schematic diagram showing an exemplary detailed display screen of such invitation information. On this detailed display screen, the information about the content of the invitation (i.e., the user name of the inviting user and the invitation message input by the inviting user) is displayed in the top right corner of the screen. Shown on the left and in the right bottom corner of the screen is detailed information about the session targeted by the invitation (e.g., game title name, session image, elapsed time since the start of the session, accessory information, number of participants in the session, and user name). The detailed information about the session is acquired from the session managing server 4. The elapsed time since the start of the session, it should be noted, is calculated from the current time information and from the session generation time information acquired from the session managing server 4. The client device 2b may request acquisition of the detailed information about the session directly from the session managing server 4. Alternatively, when the client device 2b is to acquire the invitation information from the invitation managing server 5, the invitation managing server 5 may acquire the detailed information about the session from the session managing server 4 and offer the acquired information along with the information managed by the invitation managing server 5 to the client device 2b. The timing for the client device 2b to acquire the detailed information about the session is not limited to when the invitation information is acquired from the invitation managing server 5 to display a list of invitations. Alternatively, the timing may be when the detailed information about each invitation is displayed. In this case, the most recent session status can be displayed on the detailed display screen as the session images and accessory information held by the session managing server 4 are updated over time.

The detailed display screen for the invitation also includes a "PARTICIPATE" button to be operated for participating in the session. When the invited user selectively operates the PARTICIPATE button, the client device 2b starts the game program 22 corresponding to the session to make a session participation request to the service offering server 3. If the invited user having operated the PARTICIPATE button to participate in the session does not have the game program 22 corresponding to the session, the client device 2b may access an online program selling site and display the purchase screen of the game program 22 to prompt the user to purchase the game program 22.

In the above-described embodiment of the present invention, each invitation is related to the information identifying the session targeted by the invitation. On displaying the information about an invitation, the client device 2b acquires in real time the status information (validity flag) indicating whether the related session is valid or not, and displays the information about the session in a manner reflecting the content. This allows the invited user, before accessing the service offering server 3 and attempting to participate in the session, to know whether the session can be participated in or not.

In this embodiment, in particular, the validity flag indicating the status of each session is stored in the session managing server 4 separate from the service offering server 3. When the service offering server 3 generates a session anew, the information about the new session is registered in the session managing server 4. When the service offering server 3 ends the session, the session managing server 4 is notified to that effect. The notification causes the session managing server 4 to update the validity flag stored therein regarding the session, to the value indicative of invalidity. By referencing the validity flag stored in the session managing server 4, the client device 2b can thus acquire the most recent status of the session without accessing the service offering server 3. In this embodiment, the client device 2 needs to start the corresponding game program 22 in order to access the service offering server 3. However, because the session managing server 4 apart from the service offering server 3 manages in real time the status of each session generated by the service offering server 3, the client device 2 can know whether the session to which the client device 2 has been invited can be participated in or not without starting the game program 22.

The embodiment of the present invention is not limited to the one discussed above. For example, whereas it was explained above that the service offering server 3 offers the multiplayer game service, this is not limitative of what the service offering server 3 has to offer. For example, the service offering server 3 may generate sessions for offering a chat, a voice chat, or other diverse services in which a plurality of users may concurrently participate online. In such cases, upon participating in a session that offers a chat service for example, the client device 2 may be required to execute the application program corresponding to that service.

It was also explained above that the inviting user while participating in a session transmits an invitation for the invited user to participate in the same session. In another example, the sender of the invitation is not limited to any of the users; a service provider may also send out invitations. In this example, the service offering server 3 may transmit invitation messages urging the users who meet predetermined conditions or randomly selected users to participate in the sessions managed by the service offering server 3. In this case, upon having a list of invitations displayed, the invited user references the validity flags stored in the session managing server 4. This enables the client device 2 of the invited user to display in list form the sessions to which the invitations have been extended, in a manner distinguishing the currently valid sessions from the ended sessions among the sessions to which the invitations have been extended.

The services offered by the information processing system 1 in this embodiment of the present invention are not limited to those services in which the participation by a plurality of users is mandatory. Specifically, the present invention may be applied to any online service which is not predetermined to stop being offered at any specific point in time at the start of the service and which can be accessed and used by the user while the session offering the service is being valid. For example, the present invention may be applied to a campaign service or a time sale service at an electronic commerce (EC) site. In this case, an inviting user or the service provider notifies invited users of an invitation message announcing the campaign service or the time sale service being offered. When the invitation message is displayed, the client device 2 of the invited user queries the session managing server 4 to acquire flag information indicating whether the service targeted by the invitation is valid or not, before displaying the invitation message in a manner reflecting the flag information.

It was explained above that the service offering server 3, the session managing server 4, the invitation managing server 5, the notification server 6, and the client managing server 7, all independent of one another, offer the services of the information processing system 1. However, the configuration of the server system for offering the services of the information processing system 1 is not limited to the above-described configuration. For example, the function of the session managing server 4 and that of the invitation managing server 5 may be integrally implemented by a single server computer. It was also explained above that the client device 2 acquires necessary information by individually accessing the session managing server 4 and the invitation managing server 5. Alternatively, a reception server may be provided to receive an information acquisition request and an information update request from the client device 2. The client device 2 may then perform data communication with the reception server. In this case, the client device 2 is connected to the session managing server 4 and the invitation managing server 5 indirectly via the reception server. In this example, a request made by the client device 2 to acquire invitation information from the reception server causes the reception server to acquire from the invitation managing server 5 the information about the invitations in which the user using the client device 2 is the invited user. The reception server also acquires from the session managing server 4 the information about the sessions targeted by the acquired invitations. The reception server then transmits to the client device 2 a replay that combines the invitation information acquired from the invitation managing server 5 with the session information acquired from the session managing server 4. This enables the client device 2 to acquire the necessary information without directly connecting with a plurality of servers, alleviating the processing burdens on the client side.

The invention claimed is:

1. An information processing system including a plurality of client devices and managing information about a plurality of sessions each offering a service possibly participated in by a user, the information processing system comprising:
    a session managing section configured to store status information indicating whether each of the plurality of sessions is valid or not;
        an invitation managing section configured to store a plurality of items of invitation information, each of the items of invitation information being about an invitation for an invited user to participate in one of the plurality of sessions, and
        a plurality of service offering sections configured to offer the services of which the types differ from one another, each of the service offering sections generates each of the plurality of sessions and offer the service to the user participating in any one of the generated sessions;
    wherein each of the plurality of client devices includes
        an invitation information acquiring section configured to acquire one of the plurality of items of invitation information stored in the invitation managing section, the acquired item of invitation information being about the invitation for the user using the client device to become the invited user; and
        an invitation display controlling section configured to display on a display screen the item of invitation information acquired by the invitation information acquiring section in a manner reflecting the status information,
    wherein at the time the service offering section generates a new session, the session managing section stores the status information indicating that the newly generated session is valid, the session managing section further updating the status information to a value indicating that the session is invalid at the time the service offering section ends the session,
    the session managing section stores information about the session generated by each of the plurality of service offering sections,
    the client device executes a plurality of application programs each corresponding to one of the plurality of service offering sections, and
    given a request from an executing one of the plurality of application programs, the invitation information acquiring section selectively acquires the invitation information about the invitation to the session generated by the service offering section corresponding to the executing application program.

2. The information processing system according to claim 1, wherein the invitation display controlling section displays each of the plurality of items of invitation information acquired by the invitation information acquiring section in a manner indicative of whether the session targeted by the item of invitation information is valid or not.

3. The information processing system according to claim 1, wherein the invitation display controlling section displays a list of the plurality of items of invitation information acquired by the invitation information acquiring section in an order determined by the status information.

4. A client device connected to a session managing section configured to store status information indicating whether each of a plurality of sessions offering a service possibly participated in by a user is valid or not;
    an invitation managing section configured to store a plurality of items of invitation information, each of the items of invitation information being about an invitation for an invited user to participate in one of the plurality of sessions; and
    a plurality of service offering sections configured to offer the services of which the types differ from one another, each of the service offering sections generates each of the plurality of sessions and offer the service to the user participating in any one of the generated sessions;
the client device comprising:
    an invitation information acquiring section configured to acquire one of the plurality of items of invitation information stored in the invitation managing section, the acquired item of invitation information being about the invitation for the user using the client device to become the invited user; and
    an invitation display controlling section configured to display on a display screen the item of invitation information acquired by the invitation information acquiring section in a manner reflecting the status information,
wherein at the time the service offering section generates a new session, the session managing section stores the status information indicating that the newly generated session is valid, the session managing section further updating the status information to a value indicating that the session is invalid at the time the service offering section ends the session,
the session managing section stores information about the session generated by each of the plurality of service offering sections,
the client device executes a plurality of application programs each corresponding to one of the plurality of service offering sections, and
given a request from an executing one of the plurality of application programs, the invitation information acquiring section selectively acquires the invitation information about the invitation to the session generated by the service offering section corresponding to the executing application program.

5. The client device according to claim 4, wherein the invitation display controlling section displays on the display screen the item of invitation information acquired by the invitation information acquiring section in a manner reflecting the status information while an application program to be executed upon participation in the session is not being executed.

6. The client device according to claim 4, wherein, upon participation in one of the plurality of sessions, the client device is connected to a service offering section and is offered a service therefrom, the serving offering section offering the service to the user participating in the session, and the invitation display controlling section displays on the display screen the item of invitation information acquired by the invitation information acquiring section in a manner reflecting the status information while the client device is not being connected to the service offering section.

7. The client device according to claim 4, wherein the invitation display controlling section displays on the display screen the item of invitation information acquired by the invitation information acquiring section, together with information indicative of an elapsed time since the start of the session targeted for invitation by the acquired item of invitation information.

8. A control method for a client device connected to a session managing section configured to store status information indicating whether each of a plurality of sessions offering a service possibly participated in by a user is valid or not;

an invitation managing section configured to store a plurality of items of invitation information, each of the items of invitation information being about an invitation for an invited user to participate in one of the plurality of sessions; and a plurality of service offering sections configured to offer the services of which the types differ from one another, each of the service offering sections generates each of the plurality of sessions and offer the service to the user participating in any one of the generated sessions;

the control method comprising:

acquiring one of the plurality of items of invitation information stored in the invitation managing section, the acquired item of invitation information being about the invitation for the user using the client device to become the invited user; and displaying on a display screen the acquired item of invitation information in a manner reflecting the status information, wherein at the time the service offering section generates a new session, the session managing section stores the status information indicating that the newly generated session is valid, the session managing section further updating the status information to a value indicating that the session is invalid at the time the service offering section ends the session, the session managing section stores information about the session generated by each of the plurality of service offering sections, the client device executes a plurality of application programs each corresponding to one of the plurality of service offering sections, and given a request from an executing one of the plurality of application programs, the client device selectively acquires the invitation information about the invitation to the session generated by the service offering section corresponding to the executing application program.

9. A non-transitory computer-readable information storage medium storing instructions for controlling a client device connected to a session managing section configured to store status information indicating whether each of a plurality of sessions offering a service possibly participated in by a user is valid or not, an invitation managing section configured to store a plurality of items of invitation information, each of the items of invitation information being about an invitation for an invited user to participate in one of the plurality of sessions, and a plurality of service offering sections configured to offer the services of which the types differ from one another, each of the service offering sections generates each of the plurality of sessions and offer the service to the user participating in any one of the generated sessions, to execute the processing of:

acquiring one of the stored plurality of items of invitation information, the acquired item of invitation information being about the invitation for the user using the client device to become the invited user; and displaying, on a display screen, the acquired item of invitation information in a manner reflecting the status information, wherein at the time the service offering section generates a new session, the session managing section stores the status information indicating that the newly generated session is valid, the session managing section further updating the status information to a value indicating that the session is invalid at the time the service offering section ends the session, the session managing section stores information about the session generated by each of the plurality of service offering sections, the client device executes a plurality of application programs each corresponding to one of the plurality of service offering sections, and given a request from an executing one of the plurality of application programs, the client device selectively acquires the invitation information about the invitation to the session generated by the service offering section corresponding to the executing application program.

* * * * *